United States Patent
Wilson et al.

(10) Patent No.: US 9,553,620 B2
(45) Date of Patent: Jan. 24, 2017

(54) SIGNAL DETECTION AND CHARACTERIZATION

(71) Applicant: Raytheon Company, Waltham, MA (US)

(72) Inventors: David Brent Wilson, Santa Barbara, CA (US); Lee M. Savage, Santa Barbara, CA (US); Loyra G. Dirzo, Oxnard, CA (US)

(73) Assignee: Raytheon Company, Waltham, MA (US)

( * ) Notice: Subject to any disclaimer, the term of this patent is extended or adjusted under 35 U.S.C. 154(b) by 92 days.

(21) Appl. No.: 14/332,920

(22) Filed: Jul. 16, 2014

(65) Prior Publication Data

US 2016/0020792 A1 Jan. 21, 2016

(51) Int. Cl.
*H04B 3/46* (2015.01)
*H04B 17/00* (2015.01)
(Continued)

(52) U.S. Cl.
CPC ............ *H04B 1/1018* (2013.01); *G01S 7/288* (2013.01); *G01S 7/292* (2013.01); *H04L 5/006* (2013.01);
(Continued)

(58) Field of Classification Search
CPC .. H04L 27/0012; H04L 5/0006; H04L 5/0007; H04L 5/0062; H04B 17/23; H04B 17/309; H04B 7/0837; H04B 7/12; H04B 1/1018
See application file for complete search history.

(56) References Cited

U.S. PATENT DOCUMENTS

| | | | | |
|---|---|---|---|---|
| 4,713,662 A | * | 12/1987 | Wiegand | ............... H03D 7/163 342/13 |
| 5,546,497 A | * | 8/1996 | Kao | ...................... G11B 20/24 360/32 |

(Continued)

FOREIGN PATENT DOCUMENTS

| | | |
|---|---|---|
| GB | 2300093 | 10/1996 |
| WO | 2013184232 | 12/2013 |

*Primary Examiner* — Hirdepal Singh
*Assistant Examiner* — Amneet Singh
(74) *Attorney, Agent, or Firm* — Burns & Levinson LLP; Joseph M. Maraia

(57) ABSTRACT

A method and system for detecting and characterizing an input signal receive a signal having an in-phase (I) component and a quadrature-phase (Q) component. A first IQ sample of the signal is acquired at a first point in time, and a second IQ sample of the signal is acquired at a second point in time, Using one or more processors, a delayed complex conjugate multiply (DCM) is applied to the first IQ sample of the signal and the second IQ sample of the signal to produce a constant product having an in-phase ($I_C$) component and a quadrature-phase ($Q_C$) component. A signal magnitude and a signal frequency are determined from the $I_C$ component of the constant and the $Q_C$ component of the constant, using the one or more processors.

7 Claims, 10 Drawing Sheets

(51) Int. Cl.
   *H04Q 1/20*   (2006.01)
   *H04B 1/10*   (2006.01)
   *H04L 5/00*   (2006.01)
   *G01S 7/288*  (2006.01)
   *G01S 7/292*  (2006.01)
   *H04L 12/70*  (2013.01)

(52) U.S. Cl.
   CPC .. *G01S 2007/2886* (2013.01); *H04L 2012/568* (2013.01)

(56) References Cited

U.S. PATENT DOCUMENTS

| | | | |
|---|---|---|---|
| 5,812,737 | A | 9/1998 | Wang |
| 7,340,375 | B1* | 3/2008 | Patenaud ............... G01R 29/06 702/180 |
| 7,480,234 | B1* | 1/2009 | Hart .................... H04L 27/2662 370/208 |
| 2003/0043947 | A1* | 3/2003 | Zehavi .................... H04L 27/22 375/365 |
| 2005/0232194 | A1* | 10/2005 | Hanna ................ H04B 7/15535 370/329 |
| 2006/0215778 | A1* | 9/2006 | Murthy ................. G06F 1/0353 375/260 |
| 2009/0225918 | A1* | 9/2009 | Telukuntla ........... H04B 17/336 375/360 |
| 2009/0323835 | A1* | 12/2009 | Rao ....................... H04L 5/0007 375/260 |
| 2010/0054367 | A1* | 3/2010 | Gorday ............. H04L 25/03006 375/324 |
| 2010/0195772 | A1* | 8/2010 | Kodama ............. H04L 27/0014 375/340 |

* cited by examiner

DCM Circuit Noise Power
AC Noise Power =
sum(noise -mean(noise))^2/Number of Samples
DC Noise Power = mean(noise)^2
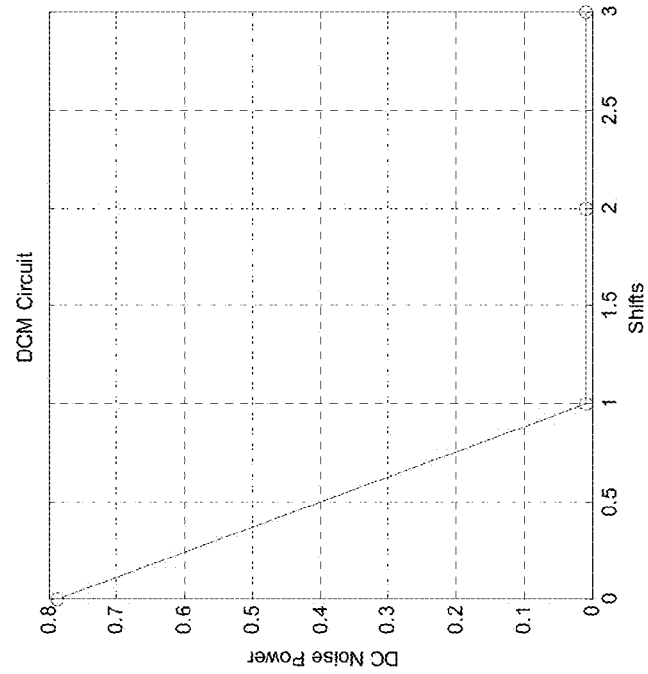
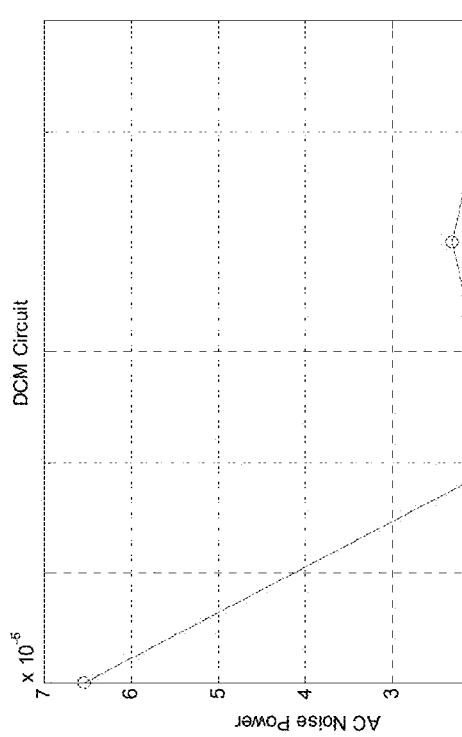
AC Noise power drops by 10 dB with DCM Circuit
FIG. 9A
DC Noise power drops by 40 dB with DCM Circuit
FIG. 9B

SIGNAL DETECTION AND CHARACTERIZATION

TECHNICAL FIELD

The present disclosure relates generally to the field of signal detection and characterization. More particularly, this application relates to technology for detecting and measuring the magnitudes and frequencies of electromagnetic signals (pulses) in digital receivers.

BACKGROUND

In modern applications such as radar detection and location, digital receivers are used to detect and characterize (e.g., determine a frequency of) electromagnetic signals (pulses). Such receivers are useful for various purposes including, for example, surveillance, threat detection, and/or threat location. Digital receivers monitor electromagnetic energy to detect and characterize potential threat signals (e.g., enemy radar). These signals are obscured by noise which is internally generated in the receiver as well as noise from external sources.

SNR is the ratio of the power of the signal of interest (SOI) relative to the power of the noise (or unwanted signal). SNR is typically measured in terms of decibels (dB). When the SOI is more powerful than the noise, the SNR is described as a positive number of decibels. When the noise is more powerful than the SOI, the SNR is described as a negative number of decibels.

When the SNR is lower than the pulse detection sensitivity limits of a digital receiver, the digital receiver becomes ineffective because potential threat signals can be missed and/or false threats may be detected. Additionally, even when a potential threat signal is detected, the SNR may be lower than the characterization sensitivity limits of the digital receiver, thereby preventing accurate characterization of the threat signal.

SUMMARY

A need therefore exists for methods and systems for detecting and characterizing signals in low SNR conditions. It would be desirable to provide such methods and systems having the capability to detect a high percentage of threat signals while generating a minimum of false threat signal detections in low SNR environments. It would also be desirable that such methods and techniques have the capability to accurately characterize detected threat signals in low SNR environments. Such methods and systems may provide improved sensitivity limits in digital receivers by decorrelating noise from raw signal data.

In one aspect, at least one embodiment described herein includes a method for detecting and characterizing an input signal. The method includes receiving a signal having an in-phase (I) component and a quadrature-phase (Q) component. The method also includes acquiring, at a first point in time, a first IQ sample of the signal. The method also includes acquiring, at a second point in time, a second IQ sample of the signal. The method also includes applying, using one or more processors, a delayed complex conjugate multiply (DCM) to the first IQ sample of the signal and the second IQ sample of the signal to produce a constant product having an in-phase ($I_C$) component and a quadrature-phase ($Q_C$) component. The method also includes determining, from the $I_C$ component of the constant product and the $Q_C$ component of the constant product, using the one or more processors, a signal magnitude and a signal frequency.

Any of the aspects and/or embodiments described herein can include one or more of the following embodiments. In some embodiments, the method also includes generating, using the one or more processors, a sequence of $I_C$ components of the constant product and a sequence of $Q_C$ components of the constant product. In some embodiments, the method also includes smoothing, using the one or more processors, the sequence of $I_C$ components of the constant product using one or more filters. In some embodiments, the method also includes smoothing, using the one or more processors, the sequence of $Q_C$ components of the constant product using the one or more filters. In some embodiments, the method also includes determining, from the smoothed $I_C$ component of the constant product and the smoothed $Q_C$ component of the constant product, using the one or more processors, a signal magnitude and a signal frequency.

In some embodiments, the DCM is determined in accordance with $A\exp(j2\pi f^*Ts^*n)^*A\exp(-j2\pi f^*Ts^*(n-1))=A^2\cos(j2\pi f^*Ts)+j^*A^2\sin(j2\pi f^*Ts)$, wherein $A\exp(j2\pi f^*Ts^*(n-1))$ is a complex number expression of the current IQ sample of the signal, $A\exp(-j2\pi f^*Ts^*(n-1))$ is a complex conjugate of a complex number expression of the previous IQ sample of the signal. $A^2\cos(j2\pi f^*Ts)=I_C$, is the real component of the product of the current and previous samples, and $j^*A^2\sin(j2\pi f^*Ts)=Q_C$, is the imaginary component of the product of the current and previous samples, wherein A is the signal magnitude, f is the signal frequency, Ts is the sample time, n is the sample number (running variable), and j is the SQRT(-1). In some embodiments, the signal magnitude is approximated in accordance with $A^2=L+S/2$ and further wherein L is a largest value of a group consisting of $|I_C|$ and $|Q_C|$ and S is a smallest value of a group consisting of $|I_C|$ and $|Q_C|$. In some embodiments, the signal frequency is determined in accordance with $f=\Phi/2\pi T_S$, wherein phase difference $\Phi$ is expressed in radians and determined in accordance with $$\Phi = \tan^{-1}\left(\frac{Q_C}{I_C}\right)$$

and further wherein Ts is a sample time.

In some embodiments, the method also includes acquiring, at one or more additional sample points in time, one or more additional IQ samples of the signal, wherein the step of applying further comprises applying the DCM to each of the one or more additional IQ sample delays of the signal. In some embodiments, the signal is a signal of interest if the signal magnitude exceeds a detection threshold. In some embodiments, at least one of the one or more filters is a smoothing filter. In some embodiments, the method also includes determining from the signal frequency, using the one or more processors, a time difference of arrival of the signal.

In one aspect, at least one embodiment described herein includes a non-transitory computer-readable medium having computer-executable instructions for performing a method. The non-transitory computer-readable medium includes receiving a signal having an in-phase (I) component and a quadrature-phase (Q) component. The non-transitory computer-readable medium also includes acquiring, at a first point in time, a current IQ sample of the signal. The non-transitory computer-readable medium also includes acquiring, at a second point in time, a previous IQ sample of the signal. The non-transitory computer-readable medium also includes applying a delayed complex conjugate multiply (DCM) to the current IQ sample of the signal and the previous IQ sample of the signal to produce a constant product having an in-phase $I_C$ component and a quadrature-phase $Q_C$ component. The non-transitory computer-readable medium also includes determining, from the $I_C$ component of the constant product and the $Q_C$ component of the constant product, a signal magnitude and a signal frequency.

Any of the aspects and/or embodiments described herein can include one or more of the following embodiments. In some embodiments, the non-transitory computer-readable medium also includes instructions for generating a sequence of $I_C$ components of the constant product and a sequence of $Q_C$ components of the constant product. In some embodiments, the non-transitory computer-readable medium also includes instructions for smoothing the sequence of $I_C$ components of the constant product using one or more filters. In some embodiments, the non-transitory computer-readable medium also includes instructions for smoothing the sequence of $Q_C$ components of the constant product using the one or more filters. In some embodiments, the non-transitory computer-readable medium also includes instructions for determining, from the smoothed $I_C$ component of the constant product and the smoothed $Q_C$ component of the constant product, using the one or more processors, a signal magnitude and a signal frequency.

In one aspect, at least one embodiment described herein includes a system for detecting and characterizing a signal. The system includes one or more processors. The system also includes a memory, the memory including executable code representing instructions. The instructions when executed cause the system to receive a signal having an in-phase (I) component and a quadrature-phase (Q) component, acquire, at a current point in time, a first IQ sample of the signal, acquire, at a previous point in time, a second IQ sample of the signal, apply, using the one or more processors, a delayed complex conjugate multiply (DCM) to the current IQ sample of the signal and a previous IQ sample of the signal to produce a constant product having an in-phase $I_C$ component and a quadrature-phase $Q_C$ component, and determine, from the $I_C$ component of the constant product and the $Q_C$ component of the constant product, using the one or more processors, a signal magnitude and a signal frequency.

Any of the aspects and/or embodiments described herein can include one or more of the following embodiments. In some embodiments, the executable code further represents instructions that when executed cause the system to generate, using the one or more processors, a sequence of $I_C$ components of the constant product and a sequence of $Q_C$ components of the constant product, smooth, using the one or more processors, the sequence of $I_C$ components of the constant product using one or more filters, smooth, using the one or more processors, the sequence of $Q_C$ components of the constant product using the one or more filters, and determine, from the smoothed $I_C$ component of the constant product and the smoothed $Q_C$ component of the constant product, using the one or more processors, a signal magnitude and a signal frequency. In some embodiments, the system includes a receiver for receiving the signal.

The methods and systems for detecting and characterizing signals in low SNR conditions described herein (hereinafter "technology") can provide one or more of the following advantages. One advantage of the technology is that noise is decorrelated from raw input IQ signal data because delayed samples are multiplied by non-delayed samples. The noise decorrelation of the technology advantageously allows for an improved pulse detection limit of a digital receiver. The noise decorrelation of the technology further advantageously allows for an improved characterization sensitivity limit of the digital receiver.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

FIG. 9A illustrates a plot of AC noise power for a DCM circuit, in accordance with various embodiments.

FIG. 9B illustrates a plot of DC noise power for a DCM circuit, in accordance with various embodiments.

DETAILED DESCRIPTION

In the following detailed description of the illustrated embodiments, reference is made to accompanying drawings, which form a part thereof, and within which are shown by way of illustration, specific embodiments, by which the subject matter may be practiced. It is to be understood that other embodiments may be utilized and structural changes may be made without departing from the scope of the disclosure.

The particulars shown herein are by way of example and for purposes of illustrative discussion of the embodiments only and are presented in the case of providing what is believed to be the most useful and readily understood description of the principles and conceptual aspects of the disclosure. In this regard, no attempt is made to show structural details of the subject matter in more detail than is necessary for the fundamental understanding of the disclosure, the description taken with the drawings making apparent to those skilled in that how the several forms of the present disclosure may be embodied in practice. Further, like reference numbers and designations in the various drawings indicate like elements.

Figure 1:
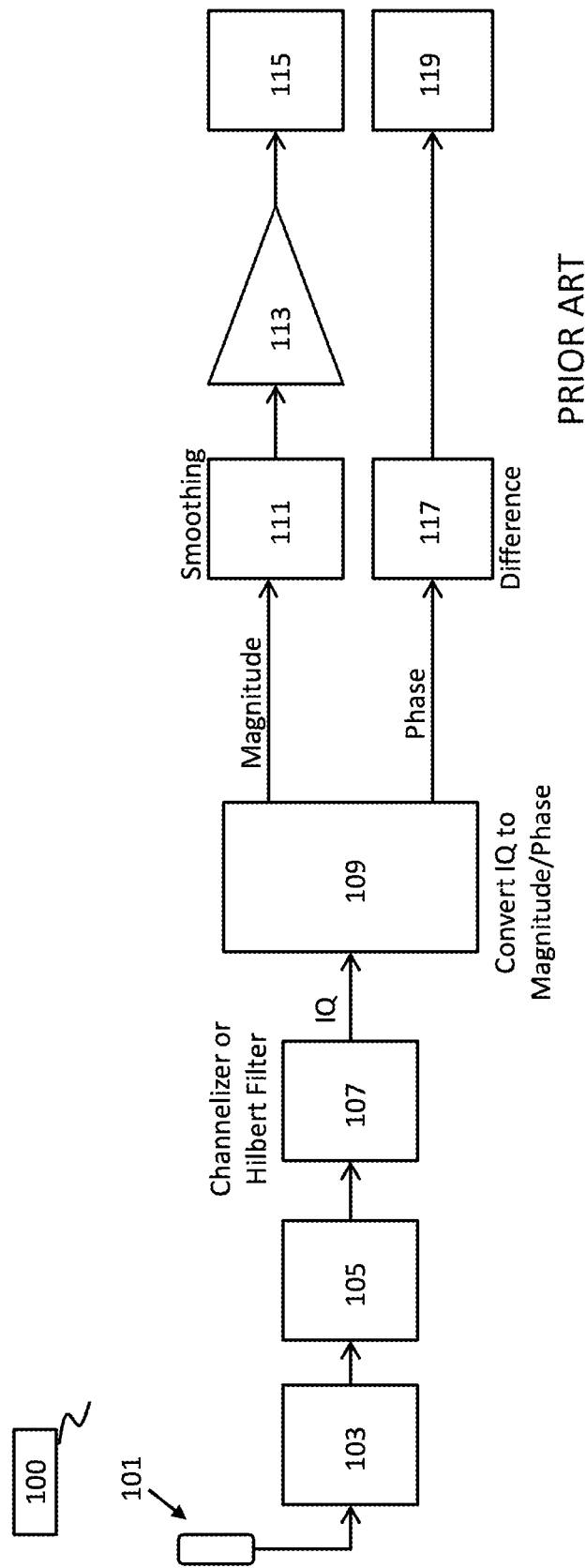
FIG. 1 is a block diagram illustrating a system for detecting and characterizing signals, in accordance with the prior art.

Described herein are devices and techniques for detecting and characterizing signals in low SNR conditions. Unless specified otherwise, signal detection, as used herein, refers to identification of a signal of interest (SOI). This is often achieved by setting a threshold signal magnitude above which the signal is considered to be a SOI. Problematically, setting the detection threshold too low can mistakenly identify unwanted noise as a SOI (referred to as false detections). However, the higher the detection threshold, the more, legitimate SOIs will be missed. Therefore, it is desirable to minimize noise and maximize the signal to noise ratio (SNR) in order to keep the detection threshold low while minimizing false detections. Unless specified otherwise, signal characterization, as used herein, refers to determining a frequency of a detected SOI. Signal characterization is typically achieved by determining a change in phase (referred to as phase difference or delta phase) of the signal between two or more samples taken over a known period of time. A low SNR can negatively impact the accuracy of frequency determination A conventional system 100 for detecting and characterizing signals is illustrated in FIG. 1. The conventional system 100 includes an antenna 101 for receiving an electromagnetic signal. The conventional system 100 also includes an analog conditioning element 103 (e.g., a voltage amplifier for increasing the amplitude of a weak signal and/or a passive and/or active filter for restricting signals outside of a desired frequency band). While it conditions the SOI, it also adds internally generated noise which may obscure the SOI. The conventional system 100 also includes an analog to digital converter (ADC) 105 (e.g., a Wilkinson ADC, a successive-approximation ADC, flash ADC) for converting a continuous physical property (usually voltage) of the analog signal to a digital number representing the property's amplitude (i.e., a digital signal). A channelizer or Hilbert filter 107 is then applied to the digital signal to convert it to the IQ format and separate various different data streams in the signal into individual signals.

The conventional system 100 also includes a converter 109 (e.g., a processor, field programmable gate array (FPGA), a microprocessor, and or any other suitable processing device) for converting the in-phase (I) and quadrature-phase (Q) components of the IQ signal into magnitude and phase components according to the relationships:

$$A(t) = \text{SQRT}(I^2 + Q^2) \quad \text{Eqn. 1}$$

and $$\varphi(t) = \arctan\left(\frac{Q(t)}{I(t)}\right) \quad \text{Eqn. 2}$$

where t is time, A(t) is magnitude and is described in terms of signal strength, often expressed in terms of dB, and $\varphi(t)$ is phase and is measured in, for example, degrees or radians, and represents a fraction of the wave cycle of the signal which has elapsed relative to the origin of that particular wave cycle at the time of sampling.

The conventional system 100 can apply one or more filters 111 to smooth the magnitude component. Smoothing the magnitude component using, for example, a moving average filter reduces the impact of noise on the signal by removing obsolete sample data and deemphasizing outliers in the data stream, providing a cleaner signal. The conventional system 100 then uses a pulse detector 115 (e.g., a processor, a field programmable gate array, and/or a computing device) to compare the smoothed magnitude with a detection threshold 113. If the smoothed magnitude exceeds the detection threshold 113, the pulse detector 115 will identify a SOI. Conversely, if the smoothed magnitude is less than the detection threshold 113, the pulse detector 115 will not detect a SOI.

The conventional system 100 uses a differencer 117 (e.g., a processor, a field programmable gate array, and/or a computing device) to determine a phase difference of the signal as described above. The phase difference (i.e., change in angular position of the wave form of the signal) for a given time period between samples is then used to calculate a frequency 119 of the signal. Frequency is expressed in terms of cycles per second (Hz) and is calculated, for example, according to:

$$\text{Frequency} = \frac{\Delta\varphi}{2\pi(\Delta t)} \quad \text{Eqn. 3}$$

where $\Delta\varphi$, expressed in radians, is the change in phase of the signal over a period of time $\Delta t$, expressed in seconds.

Unfortunately, the conventional system 100 often suffers from poor SNR performance. In general, the channelizer/Hilbert filter 107 relies, for example, on a fast Fourier Transform (FFT) to identify and separate the various different data streams in the digital signal into individual signals and then autocorrelates the sample.

In general, autocorrelation is defined as the cross-correlation of a signal with itself. Autocorrelating the complex IQ signal values of the same sample, i.e., at a time lag of zero, maximizes the signal power because, for autocorrelated signals, there will always be a peak at a lag of zero unless the signal is a trivial zero signal because, at zero lag, the signal power is being squared. In such cases, autocorrelation for each sample is determined as the product of the IQ signal and its complex conjugate, referred to as a complex conjugate multiply (CCM). However, because the CCM is multiplying the measured IQ signal by itself, the noise power contributions are also squared, potentially degrading the SNR, especially in low SNR scenarios such as where SNR is negative. As described above, SNR degradation negatively impacts system performance and causes misidentification of received signals.

Figure 2A:
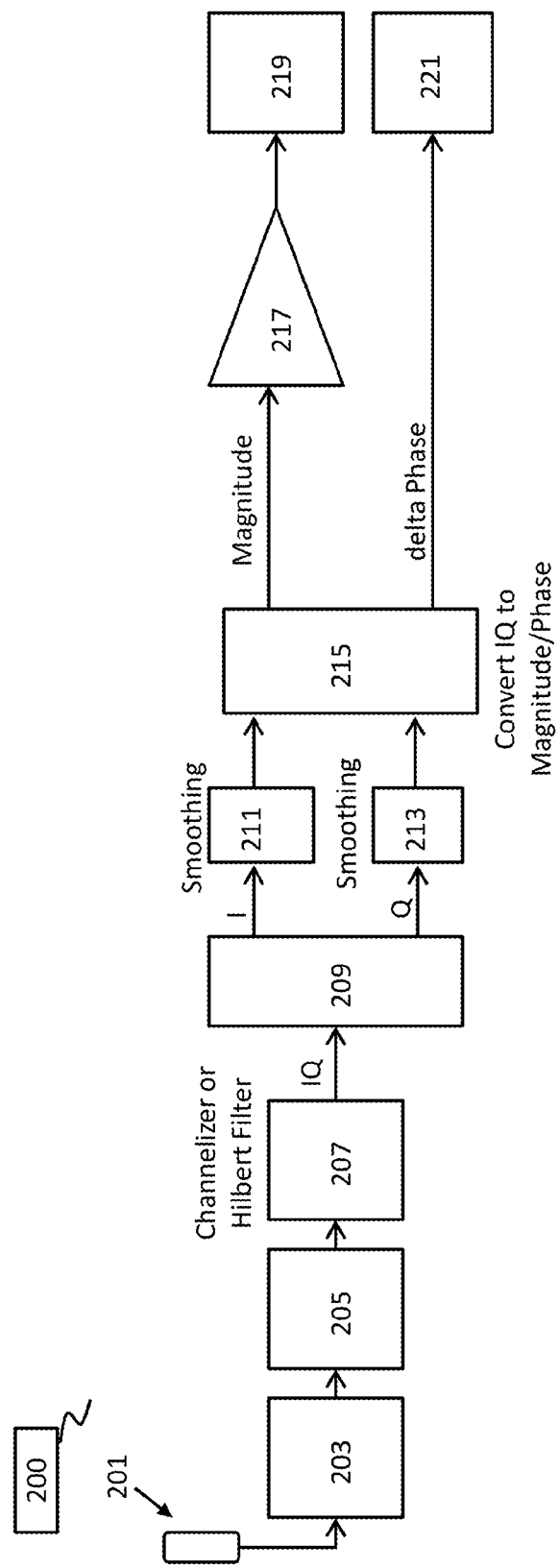
FIGS. 2A-2B are block diagrams illustrating a system for decorrelating noise in a signal, in accordance with various embodiments.
Figure 2B:
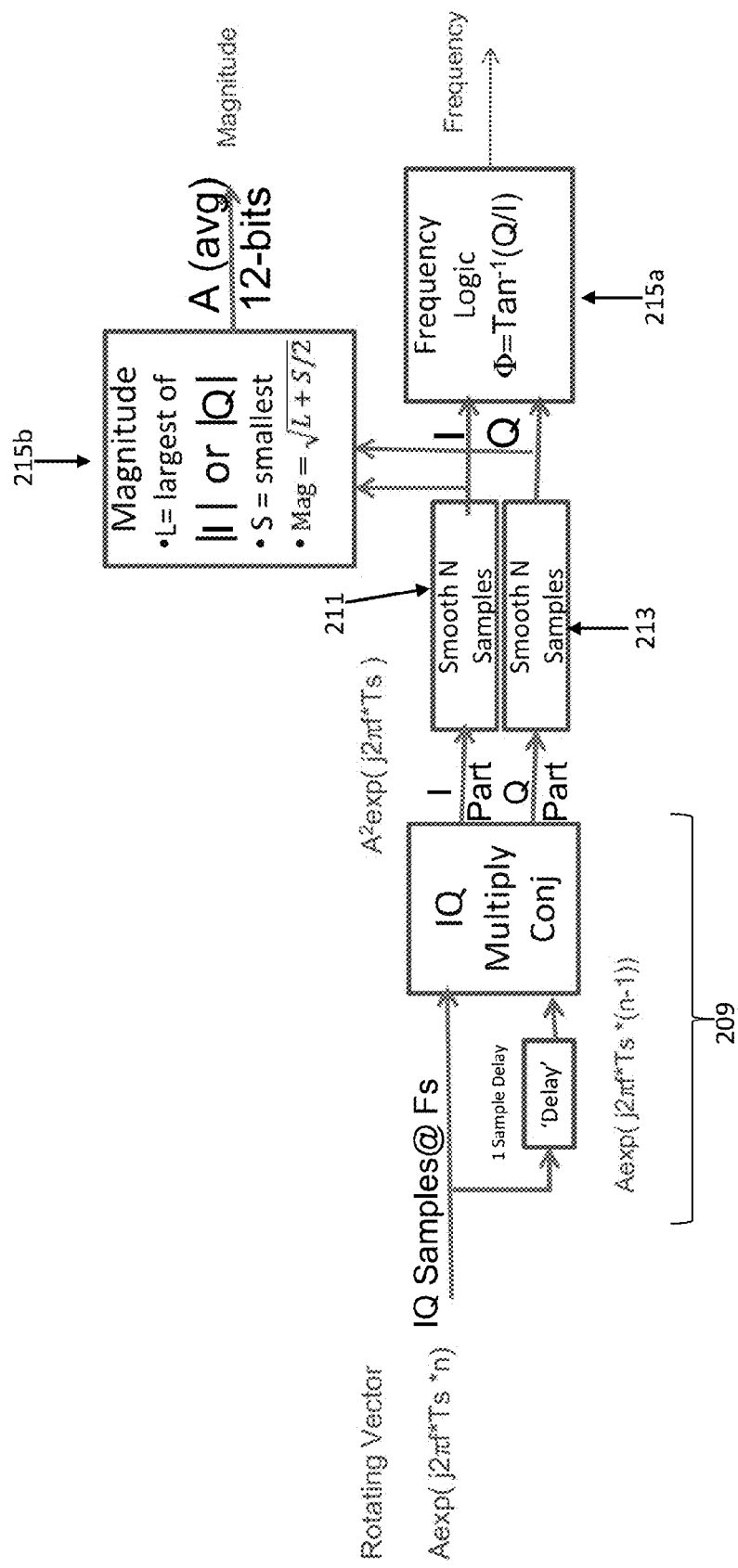

FIGS. 2A-2B illustrate a system 200 that provides improved, low SNR performance. System 200 detects and characterizes a signal by applying a delayed complex conjugate multiply (DCM) 209 to a non-delayed sample and at least one delayed sample. The system 200 also includes an analog conditioning element 203 (e.g., a voltage amplifier for magnifying a weak signal and/or a passive and/or active filter for restricting signals outside of a desired frequency band, while adding noise). The system 200 also includes an analog to digital converter 205 and an optional channelizer or Hilbert filter 207 applied to the signal. The analog to digital converter 205 and the optional channelizer or Hilbert filter 207 output complex digital values to describe each sample of the signal. In various embodiments, antenna 201, analog conditioning element 203, analog to digital converter 205, and the channelizer or Hilbert filter 207 can be, for example, but are not limited to, any of antenna 101, analog conditioning element 103, analog to digital converter 105, and the channelizer or Hilbert filter 107 described above with reference, for example, to FIG. 1.

Referring now to FIGS. 2A-2B, the system 200 then applies a delayed complex conjugate multiply (DCM) 209 using both a first sample of the signal and a second sample of the signal to produce a constant product having an in-phase ($I_C$) component and a quadrature-phase ($Q_C$) component. The DCM 209 is applied in accordance with:

$$A\exp(j2\pi f^*T_S^*n)^*A\exp(-j2\pi f^*T_S^*(n-1)) = A^2\exp(j2\pi f^*T_S) \qquad \text{Eqn. 4}$$

to produce a constant product, where $A\exp(j2\pi f^*T_S^*n)$ is a complex number expression of the current IQ sample of the signal and $A\exp(-j2\pi f^*T_S^*(n-1))$ is a complex conjugate of the complex number expression of the previous IQ sample of the signal, A is the signal magnitude, f is the signal frequency, $T_S$ is the sample time, n is the sample number (running variable) (i.e., n correlates to the current sample and n-1 correlates to the previous sample), and j is the SQRT(-1). $A^2\exp(j2\pi f^*T_S)$ is a constant product of the complex number expression of the current IQ sample and the complex conjugate of the complex number expression of the previous IQ sample. This constant product can be separated into real and imaginary components according to:

$$A^2\exp(j2\pi f^*T_S) = A^2\cos(j2\pi f^*T_S) + j^*A^2\sin(j2\pi f^*T_S) \qquad \text{Eqn. 5}$$

where $A^2\cos(j2\pi f^*T_S) = I_C$ and is the real component of the constant product, and $j^*A^2\sin(j2\pi f^*T_S) = Q_C$ and is the imaginary component of the constant product. Thus, the signal is converted to real ($I_C$) and imaginary ($Q_C$) components of a constant product. As described in greater detail below, applying the DCM to a current IQ sample and a delayed IQ sample results in decorrelation of the incoherent noise from the coherent SOI, thereby improving low SNR performance.

The DCM 209 provides improved SNR performance over the conventional system 100 (CCM) because, rather than relying on squared values, the DCM autocorrelates by multiplying the complex number expression of the current IQ sample of the signal with a complex conjugate of the complex number expression of the previous IQ sample of the signal. Over a series of samples, the power of the signal of interest (SOI) is constant and fluctuations in the IQ values are caused by noise. Therefore, between a current sample and a delayed sample, the signal remains constant and thus remains correlated by the DCM but the noise component changes and thus is decorrelated by the DCM.

This effect is illustrated in FIGS. 9A and 9B. FIGS. 9A and 9B show the random (AC) noise characteristics and mean (DC) noise characteristics, respectively, of the sample set shown in FIGS. 7A-8B. The DC noise power is defined as the average value of noise squared for the sample set. The AC noise power is defined as average of the noise variance, expressed as sum(noise-mean(noise))^2/number of samples. As shown in FIGS. 9A-9B, a shift of zero corresponds to the standard Magnitude, i.e., the conventional system 100. Shifts 1, 2, and 3 correspond to a 1 sample delay, a 2 sample delay, and a 3 sample delay, respectively. As shown in FIG. 9A, the AC noise power is reduced by 10 dB due to the decorrelation action of the DCM circuit. As shown in FIG. 9B, the DC noise power is reduced by even more, 40 dB, due to the decorrelation action of the DCM circuit.

The system 200 further improves noise reduction properties by optionally applying one or more filters 211 to smooth the $I_C$ component and one or more filters 213 to smooth the $Q_C$ component. Smoothing is advantageous because it reduces the impact of noise on each component of the constant product by removing obsolete sample data and deemphasizing outliers in the data stream. The system 200 also includes a converter 215 (comprising a phase converter 215a and a magnitude converter 215b) for converting the $I_C$ component and the $Q_C$ component or, in accordance with various embodiments, the smoothed $I_C$ component and the smoothed $Q_C$ component, into magnitude and phase components of the signal. In various embodiments, converter 215 may comprise, for example, one or more processors, field programmable gate arrays (FPGA), microprocessors, and or any other suitable processing devices configured to apply Eqn. 6 (e.g., magnitude converter 215b) and/or Eqns. 7-8 (e.g., phase converter 215a) to the $I_C$ component and the $Q_C$ component or, in accordance with various embodiments, the smoothed $I_C$ component and the smoothed $Q_C$ component.

As shown in FIGS. 2A-2B, in various embodiments, the magnitude of the signal is determined by the magnitude converter 215b in accordance with the equation:

$$A^2 = M = \sqrt{I^2 + Q^2} \qquad \text{Eqn. 6}$$

As described above with reference, for example, to FIG. 1, magnitude is described in terms of signal strength, often expressed in terms of dB. Also as described above with reference, for example, to FIG. 1, phase is measured in, for example, degrees or radians, and represents a fraction of the wave cycle of the signal which has elapsed relative to the origin of that particular wave cycle at the time of sampling. The system 200 includes a pulse detector 219 (e.g., a processor, a field programmable gate array, and/or a computing device) to compare the magnitude with a detection threshold 217. If the magnitude exceeds the detection threshold 217, the pulse detector 219 will identify a SOI. Conversely, if the magnitude is less than the detection threshold 217, the pulse detector 219 will not detect a SOI.

As further shown in FIGS. 2A-2B, in various embodiments, a phase difference $\Phi$, expressed in radians, is determined by the phase converter 215a in accordance with the equation:

$$\Phi = \tan^{-1}\left(\frac{Q_C}{I_C}\right) \qquad \text{Eqn. 7}$$

The phase difference (i.e., change in angular position of the wave form of the signal) for a given time period between samples is then used by a frequency converter 221 to calculate a frequency of the signal. In various embodiments, the frequency converter 221 determines the frequency of the signal in accordance with the equation:

$$f = \Phi 2\pi T_S \qquad \text{Equ. 8}$$

where $T_S$ is the time difference between the current sample point in time and the previous sample point in time and is expressed in seconds.

Figure 3:
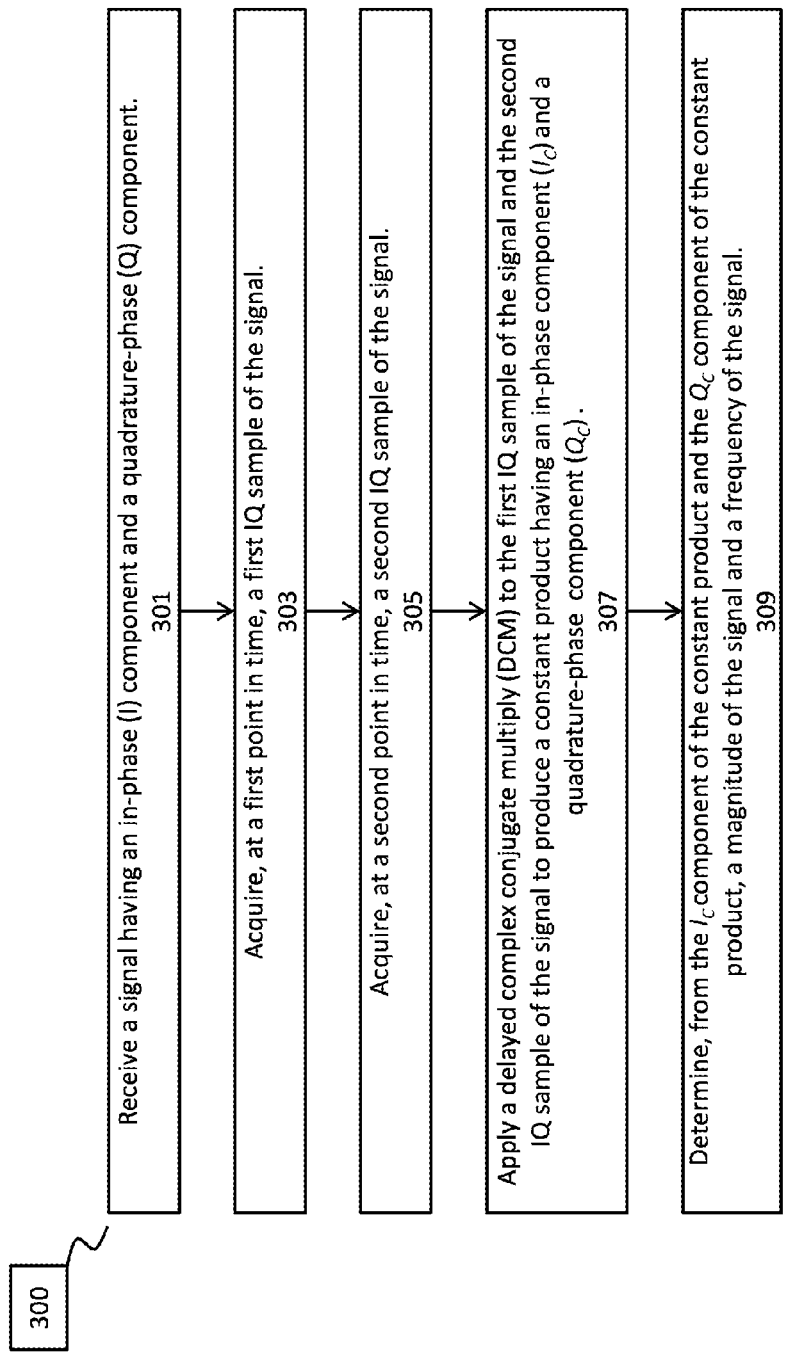
FIG. 3 is a flow chart illustrating a method for detecting and characterizing signals, in accordance with various embodiments.

As illustrated by FIG. 3, improved, low SNR performance can be achieved using a method 300 for detecting and characterizing a signal. The method 300 includes receiving a signal having an in-phase (I) component and a quadrature-phase (Q) component 301. The method also includes acquiring, at a first point in time, a first IQ sample of the signal 303 and acquiring, at a second point in time, a second IQ sample of the signal 305. The method 300 also includes, applying a DCM to the first IQ sample of the signal and the second IQ sample of the signal to produce a constant product having an in-phase component $I_C$ and a quadrature-phase component $Q_C$ 307, as described above with respect to, for example, Eqns. 4-5. The method 300 also includes determining, from the $I_C$ component of the constant product and the $Q_C$ component of the constant product, a magnitude of the signal and a frequency of the signal 309, as described above with respect to, for example, Eqns. 6-8.

The step of receiving a signal having an I component and a Q component 301, in accordance with various embodiments, includes measuring and/or receiving a signal using any suitable device. Suitable devices include, for example, one or more antennas as described above with reference, for example, to FIG. 1 and/or an electrical interface with a signal transmitting cable or device such as a coaxial cable, fiber optic cable or USB storage drive.

The steps of acquiring, at a first point in time, a first IQ sample of the signal 303 and acquiring, at a second point in time, a second IQ sample of the signal 305 each include capturing, using a receiver, a sample of the signal at a particular point in time. In various embodiments, the receiver includes any of the suitable devices described above with reference, for example, to step 301. The receiver, in various embodiments, optionally includes various additional elements which can be used to condition and improve the quality of the signal. Such additional elements can include but are not limited to, analog conditioning elements 203, analog to digital converters 205, and/or channelizers or Hilbert filters 207 as described above with reference, for example, to FIGS. 2A-2B.

The step of applying a DCM 307 to the first IQ sample of the signal and the second IQ sample of the signal to produce a constant product having an in-phase component $I_C$ and a quadrature-phase component $Q_C$ is, in accordance with various embodiments, performed according to Eqns. 4-5 described above with reference, for example, to FIGS. 2A-2B. The DCM is applied, for example, by one or more processors. Processors include, by way of example, both general and special purpose microprocessors, field programmable gate arrays (FPGA), application-specific integrated circuits (ASIC), and/or any one or more processors of any kind of digital computer.

The step of determining 309, from the $I_C$ component of the constant product and the $Q_C$ component of the constant product, a magnitude of the signal and a frequency of the signal is not limited to but, in various embodiments, is performed according to Eqns. 6-8 as described above with reference, for example, to FIGS. 2A-2B. The determining step 309 can be achieved using, for example, a processor, a field programmable gate array, and/or a computing device.

Figure 7A:
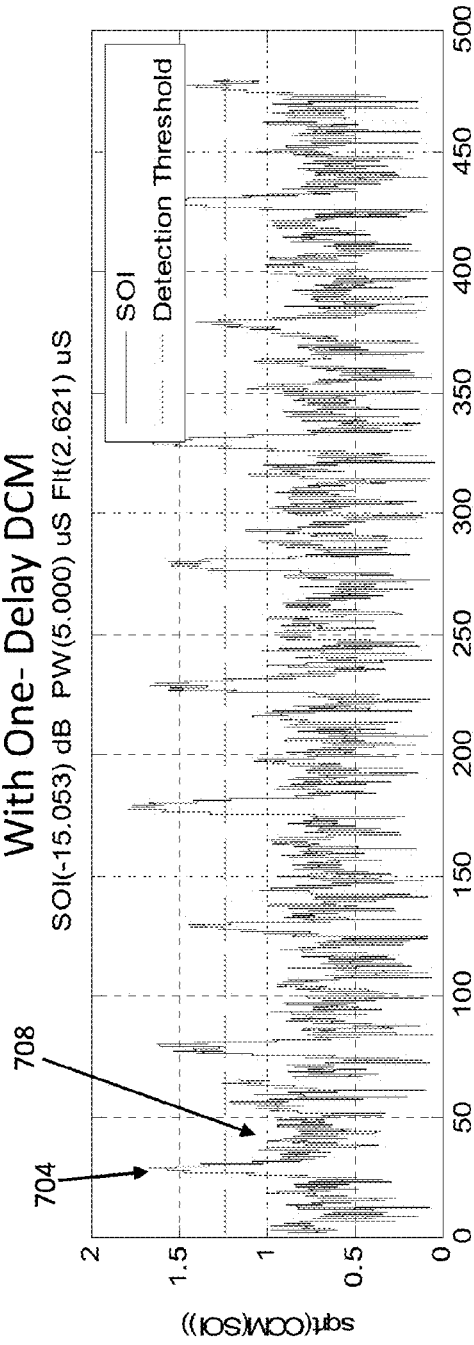
FIG. 7A illustrates a plot of magnitude versus pulse width using a system for decorrelating noise in a signal, in accordance with various embodiments.
Figure 7B:
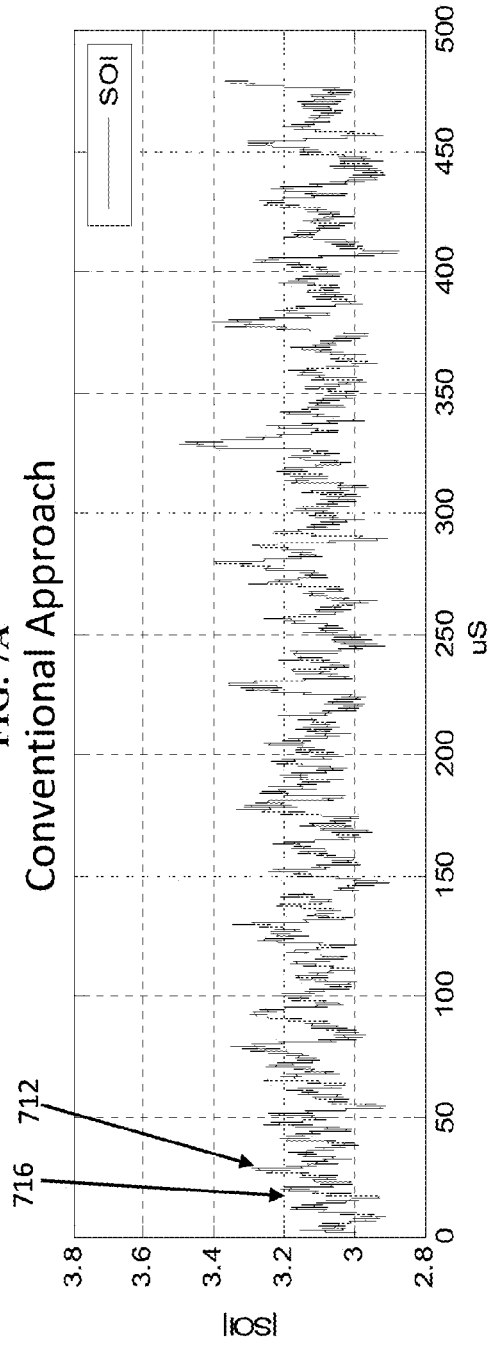
FIG. 7B illustrates a plot of magnitude versus pulse width using a conventional detection and characterization system.

In various embodiments, application of the DCM techniques described herein advantageously improves (reduces) the SNR required to produce adequate frequency measurements for signal characterization and adequate magnitude measurements for signal detection. The improved performance is achieved because applying the DCM advantageously decorrelates incoherent noise from the coherent SOI. In various embodiments, the SNR required to produce adequate frequency measurements is improved by between 8-10 dB over prior art methods. In various embodiments, the SNR required to produce adequate magnitude measurements, as illustrated in FIGS. 7A and 7B, is improved by 1 dB to 3 or more dB over prior art methods.

Figure 4:
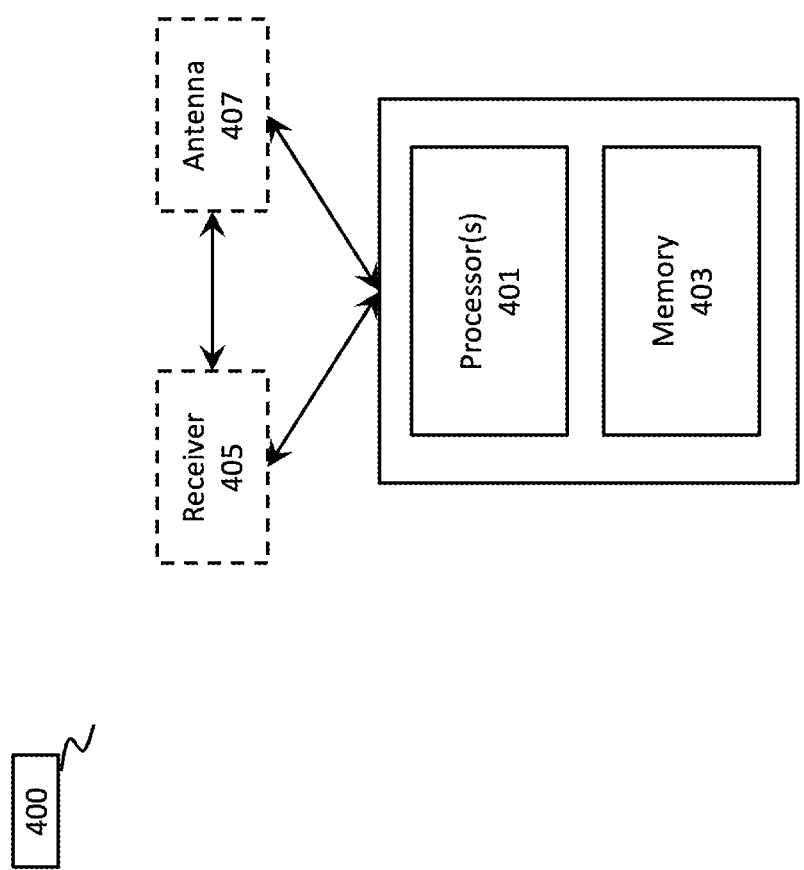
FIG. 4 is a block diagram illustrating a system for detecting and characterizing signals, in accordance with various embodiments.

FIG. 4 illustrates a system 400 for detecting and characterizing a signal. The system 400 includes one or more processors 401 for applying a DCM to samples of a signal and a memory 403 for storing DCM instructions executable by the processor(s) 401. In various embodiments, the system 400 includes a receiver 405 for sampling and/or preprocessing the signal (e.g, performing analog conditioning, converting the signal from analog to digital, channelizing, and/or applying a Hilbert filter as described above with reference, for example, to elements 203, 205, and 207 of FIGS. 2A-2B). In various embodiments the system 400 optionally includes an antenna 407 for measuring the signal.

The one or more processors 401 may include, by way of example, both general and special purpose microprocessors, field programmable gate arrays (FPGA), application-specific integrated circuits (ASIC), and/or any one or more processors of any kind of digital computer. The memory 403 may include, by way of example, one or any combination of non-volatile memory, including by way of example, semiconductor memory devices, EPROM, EEPROM, flash memory devices, magnetic disks, internal hard disks, removable disks, magneto-optical disks, CD-ROM, and/or DVD-ROM disk.

In various embodiments, the one or more processors 401 are configured to execute instructions for detecting and characterizing a signal stored on the memory 403. In accordance with various embodiments, the instructions cause the processor(s) 401 to acquire a current IQ sample of the signal and at least one delayed IQ sample of the signal. In various embodiments, the system 400 optionally includes an antenna 407 for measuring the signal and/or a receiver 405 for sampling and/or preprocessing the signal. In various embodiments the system 400 receives the IQ samples from an external source (e.g., an antenna/receiver array in communication with the system 400).

The instructions, when executed, then cause the processor (s) 401 to apply a delayed complex conjugate multiply (DCM) (e.g., according to Eqns. 4-5 as described above with reference, for example, to FIGS. 2A-2B) to the current IQ sample of the signal (e.g., sample n) and a previous IQ sample of the signal (e.g., sample n−1) to produce a constant product having an in-phase $I_C$ component and a quadrature-phase $Q_C$ component. In various embodiments, the instructions cause the processor(s) 401 to also apply a DCM (e.g., according to Eqns. 9 and 5 as described below with reference, for example, to FIG. 5) to the current IQ sample of the signal (e.g., sample n) and one or more additional IQ samples of the signal (e.g., samples n−2, n−3 . . . n−i). Applying the DCM includes, for example but not limited to, any DCM application as described above with reference, for example, to FIGS. 2-3 or below with reference, for example, to FIGS. 5-6. In various embodiments, the instructions optionally cause the processor(s) 401 to smooth the $I_C$ component of the constant product and the $Q_C$ component of the constant product. Smoothing reduces the impact of noise on each component of the constant product by removing obsolete sample data and deemphasizing outliers in the data stream. Such smoothing is performed, for example but not limited to, according to any technique described herein with reference, for example, to FIGS. 2-3 and 5-6.

The instructions, when executed, then cause the processor (s) 401 to determine, from the $I_C$ component and the $Q_C$ component, the magnitude of the signal and the frequency of the signal. In various embodiments, if the smoothed magnitude exceeds a detection threshold stored in the memory 403, the system 400 is configured to identify a SOI. Conversely, if the smoothed magnitude is less than the detection threshold, the system 400 will not detect a SOI. In various embodiments, as described in further detail with reference, for example, to FIGS. 5-6, a plurality of $I_C$ components and $Q_C$ components are generated by the system 400. In such embodiments, a magnitude of the signal is optionally determined for each $I_C$-$Q_C$ pair and the plurality of magnitudes is then averaged to produce an improved magnitude (i.e., additional noise is decorrelated due to the averaging as described below with reference, for example, to FIGS. 5-6).

Figure 5:
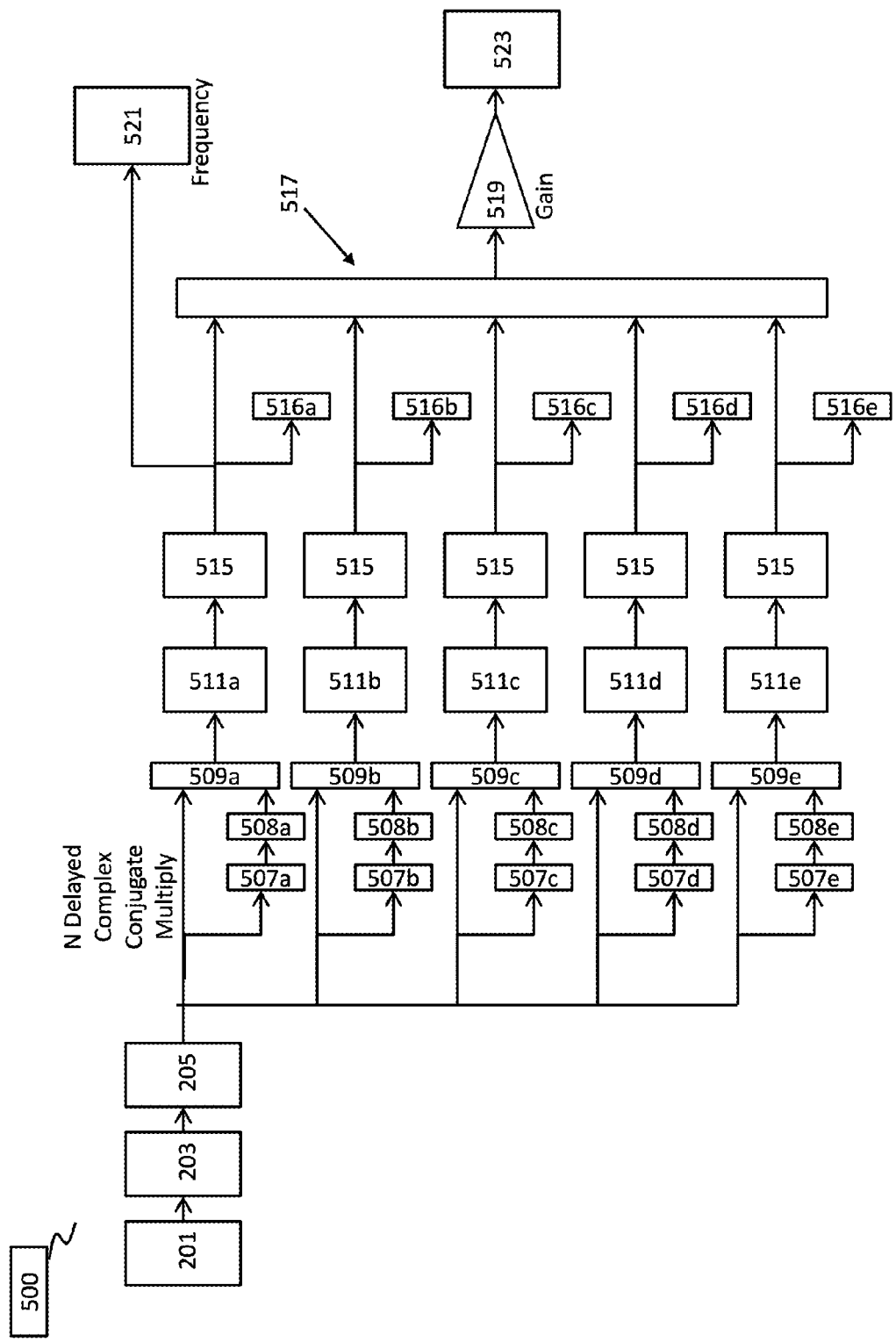
FIG. 5 is a block diagram illustrating a second system for decorrelating noise in a signal, in accordance with various embodiments.

As illustrated by FIG. 5, a system 500 for detecting and characterizing a signal includes an antenna 201, a conditioning element 203, and an analog to digital converter 205 as described above with reference, for example, to FIGS. 2A-2B. The system 500 improves low SNR performance by applying a delayed complex conjugate multiply (DCM) 509a to a non-delayed (current) sample and a complex conjugate 508a of a delayed sample 507a. The system 500 further improves low SNR performance by applying additional DCMs 509b-509e to the current sample and at least one additional complex conjugate 508b-508e of at least one additional delayed sample 507b-507e. As shown in FIG. 5, for example, the first DCM 509a is applied to the current sample (e.g., sample n as described with reference, for example, to Eqn. 4) and the complex conjugate 508a of the first delayed sample 507a (e.g., sample n−1 as described with reference, for example, to Eqn. 4). The second DCM 509b is applied to the current sample and the complex conjugate 508b of the second delayed sample 507b (e.g., sample n−2 as described below with reference, for example, to Eqn. 9). In accordance with various embodiments illustrated by FIG. 5, a third DCM 509c, a fourth DCM 509d, and a fifth DCM 509e are applied to third through fifth complex conjugates 508c-508e of third through fifth delayed samples 507c-507e (e.g., samples n−3, n−4, and n−5) respectively. More generally, any number of DCMs can be applied to any number of delayed samples (e.g., one (up to n−1), two (up to n−2), five (up to n−5), ten (up to n−10), one-hundred (up to n−100) . . . any number of delayed samples (up to n−i)) and will be limited only by available processing resources.

Applying the first DCM 509a to the current sample of the signal and the complex conjugate 508a of the first delayed sample of the signal 507a produces a first constant product having an in-phase ($I_{C1}$) component and a quadrature-phase ($Q_{C1}$) component and is applied in accordance with Eqns. 4-5 as described above with reference, for example, to FIGS. 2A-2B. For further delayed IQ samples (e.g., 507b-507e), the DCMs (e.g., 509b-509e) are applied in accordance with:

$$A\exp(j2\pi f^*T_S^*n)^*A\exp(-j2\pi f^*T_S^*(n-i))=A^2\exp(j2\pi f^*T_S) \qquad \text{Eqn. 9}$$

to produce a constant product for each delayed IQ sample, where $A\exp(j2\pi f^*T_S^*n)$ is a complex number expression of the current IQ sample of the signal and $A\exp(j2\pi f^*T_S^*(n-i))$ is a complex conjugate of the complex number expression of the relevant delayed IQ sample (e.g., 507a-507e) of the signal, A is the signal magnitude, f is the signal frequency, $T_S$ is the sample time, n is the sample number (running variable) (i.e., n correlates to the current sample and n−i correlates to the delayed sample 507), i is the number of sample cycles that the relevant delayed IQ sample has been delayed (e.g., 1, 2, 3, 4, and 5 as shown in FIG. 5), and j is the SQRT(−1). $A^2\exp(j2\pi f^*T_S)$ is a constant product of the complex number expression of the current IQ sample and the complex conjugate of the complex number expression of the previous IQ sample. This constant product can be separated into real and imaginary components $I_{Ci}$ and $Q_{Ci}$ according to Eqn. 5 as described above.

The system 500 optionally applies one or more filters 511a-511e to smooth each $I_{Ci}$ and $Q_{Ci}$. Smoothing is advantageous because it reduces the impact of noise on each component of the constant product by removing obsolete sample data and deemphasizing outliers in the data stream. Smoothing each $I_{Ci}$ component and the $Q_{Ci}$ component advantageously provides additional noise reduction when compared with, for example, prior art system 100, which filters only one element (the magnitude component) of the signal. Smoothing each component can be performed by independently using, for example but not limited to, any of the filters 211, 213 described above with reference, for example, to FIGS. 2A-2B. However, because the smoothing performed by filter(s) 511a-511e uses averaged historical $I_{Ci}$ and $Q_{Ci}$ data, better smoothing performance is achieved than by filters (e.g., filters 211, 213), which use historical single $I_C$ and $Q_C$ data. Therefore, applying multiple DCMs, in various embodiments, advantageously provides additional improvements in low SNR performance for both magnitude and frequency determinations.

The system 500 also includes one or more converters 515, for converting the $I_{Ci}$ components and the $Q_{Ci}$ components or, in accordance with various embodiments, the smoothed $I_{Ci}$ component and the smoothed $Q_{Ci}$ component, into magnitude and phase components of the signal. Although FIG. 5 depicts a single converter 515 for each applied DCM, it will be apparent in view of the present disclosure that one converter can be used to convert any number of $I_{Ci}$ components and $Q_{Ci}$ components into magnitude and phase components. It will be further apparent in view of this disclosure that more than one converter 515 can be used to convert each $I_{Ci}$ component and $Q_{Ci}$ component into magnitude and phase components.

As shown in FIG. 5, in various embodiments, a magnitude 516a-516e of the signal is determined in accordance with Eqn. 6 for each applied DCM 509a-509e. The magnitudes 516a-516e are then input into an adder 517 (e.g., half-adder, full adder, lookahead carry unit) and then averaged using a gain device 519 (e.g., an amplifier) to generate an improved magnitude. The gain device 519, in various embodiments, has a gain equal to $$\frac{1}{i}$$

where i is the number of DCMs applied by the system 500. The system 500 also includes a pulse detector 523 (e.g., a processor, a field programmable gate array, and/or a computing device), which compares the magnitude with a detection threshold. If the magnitude exceeds the detection threshold, the pulse detector 523 will identify a SOI. Conversely, if the magnitude is less than the detection threshold, the pulse detector 523 will not detect a SOI.

As further shown in FIG. 5, in various embodiments, the frequency 521 of the signal is calculated for the current IQ sample of the signal and the first delayed sample 507 of the signal from a phase difference Φ, as described above with reference, for example, to FIGS. 2A-2B and Eqns. 7-8. In various embodiments, determining a frequency of the signal can advantageously allow, for example, a downstream geolocation system to calculate a time difference of arrival (TDOA) of the signal at antenna 101 and one or more additional antennas. Thereby, the geolocation system can advantageously triangulate the location of the source of the signal.

In various embodiments, application of the DCM techniques described herein advantageously improves (reduces) the SNR required to produce adequate frequency measurements for signal characterization and adequate magnitude measurements for signal detection. As explained above with reference, for example, to FIG. 2, the improved performance is achieved because applying the DCM advantageously decorrelates incoherent noise from the coherent SOI. In various embodiments, further improvement is achieved by applying a DCM to multiple delayed samples because the averaged components result in further decorrelation of incoherent noise from the coherent SOI.

Figure 8A:
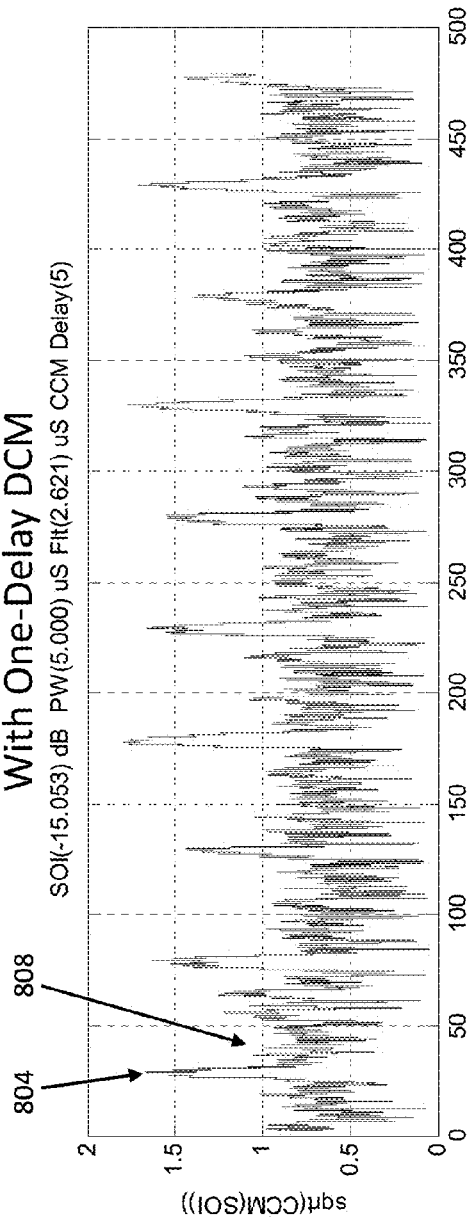
FIG. 8A illustrates a plot of magnitude versus pulse width using a system for decorrelating noise in a signal using only one delayed sample, in accordance with various embodiments.
Figure 8B:
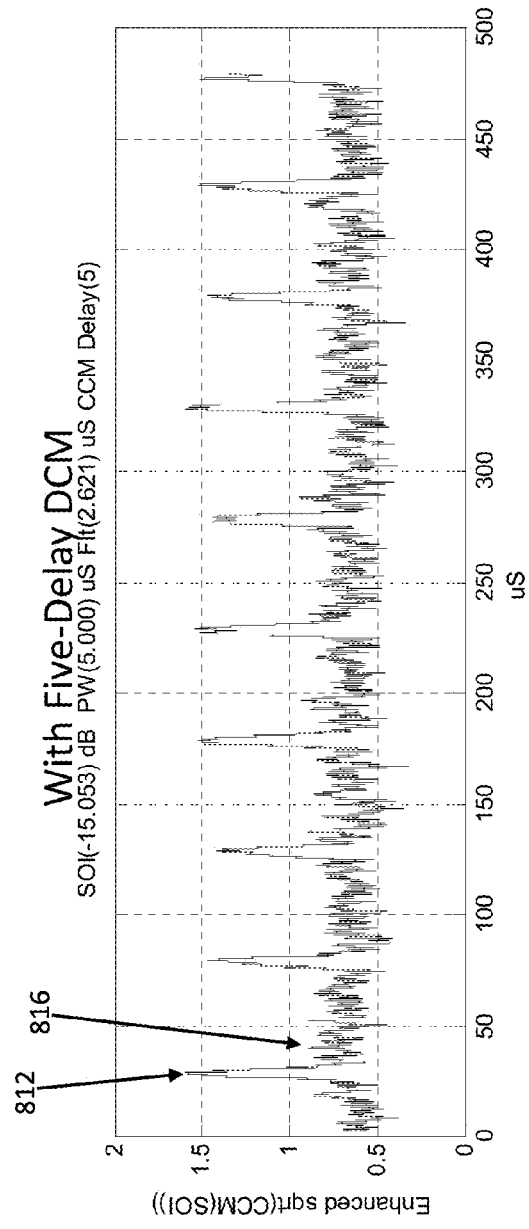
FIG. 8B illustrates a plot of magnitude versus pulse width using a system for decorrelating noise in a signal using a plurality of delayed samples, in accordance with various embodiments.

Applying the DCM to multiple delayed samples as shown, for example, in FIG. 5 advantageously reduces the SNR required to produce adequate frequency measurements is improved by approximately 2 dB over applying the DCM to a single delayed sample. In various embodiments, the SNR required to produce adequate magnitude measurements, as illustrated in FIGS. 8A and 8B, is improved by approximately 2 dB over applying the DCM to a single delayed sample.

Figure 6:
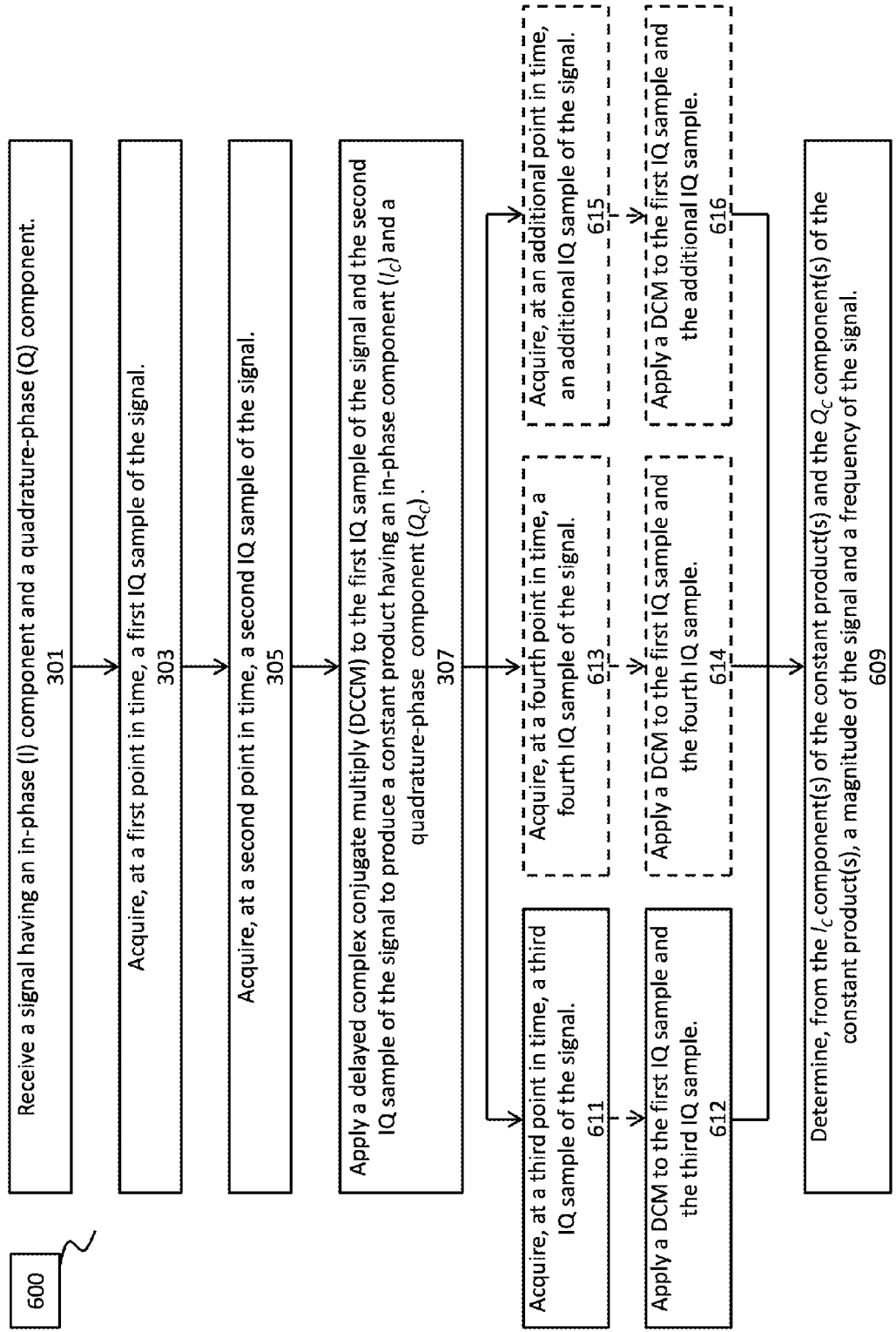
FIG. 6 is a flow chart illustrating a second method for detecting and characterizing signals, in accordance with various embodiments.

As illustrated by FIG. 6, improved, low SNR performance can be achieved using a method 300 for detecting and characterizing a signal. The method 600 includes steps 301, 303, 305, and 307 as described above with reference, for example, to FIG. 3. As shown in FIG. 6 the method 600 also includes acquiring, at a third point in time, a third IQ sample of the signal 611. Acquiring a third IQ sample of the signal 611 is performed, for example but not limited to, as described above with reference, for example, to acquiring a first IQ sample 303 and a second IQ sample 305. The method also includes applying the DCM to the first IQ sample and the third IQ sample 612. Applying the DCM to the first IQ sample and the third IQ sample 612 is performed, for example, but not limited to, applying a DCM as described above with reference, for example, to FIG. 5 and Eqn. 9.

The method 600 also includes optionally acquiring a fourth IQ sample of the signal 613 and/or any number of additional IQ samples of the signal 615, each of which is performed for example but not limited to, as described above with reference, for example, to acquiring a first IQ sample 303, a second IQ sample 305, and/or a third IQ sample 611. The method also optionally includes applying the DCM to the first IQ sample and the fourth IQ sample 614. Applying the DCM to the first IQ sample and the fourth IQ sample 614 is performed, for example, but not limited to, applying a DCM as described above with reference, for example, to FIG. 5 and Eqn. 9. The method also optionally includes applying the DCM to the first IQ sample and any of the additional IQ samples 616. Applying the DCM to the first IQ sample and any of the additional IQ samples 616 is performed, for example, but not limited to, applying a DCM as described above with reference, for example, to FIG. 5 and Eqn. 9.

The step of determining 609, from the $I_C$ component(s) of the constant product(s) and the $Q_C$ component(s) of the constant product(s), a magnitude of the signal and a frequency of the signal is not limited to but, in various embodiments, is performed according to Eqns. 6-8 as described above with reference, for example, to FIG. 5. The determining can be achieved using, for example, a processor, a field programmable gate array, and/or a computing device.

FIG. 7A illustrates a plot of magnitude in dB (shown along the y-axis) versus pulse width in microseconds (µS) (shown along the x-axis). The plot was generated using a one-delay system which applied a single DCM as described above with respect to, for example, FIGS. 2A-2B and Eqns. 4-8, in accordance with various embodiments. The solid line (labeled SOI) tracks the value of the magnitude signals output by the system. The dashed line indicates a detection threshold above which a threat is detected by the system.

FIG. 7B illustrates a plot of magnitude in dB (shown along the y-axis) versus pulse width in microseconds (µS) (shown along the x-axis). The plot was generated using a conventional system as described above with respect to, for example, FIG. 1 and Eqns. 1-3. The solid line (labeled SOI) tracks the value of the magnitude outputs of the system.

Comparing FIG. 7A to FIG. 7B illustrates that the SNR of the DCM system shown in FIG. 7A is advantageously improved over the SNR of the conventional system shown in FIG. 7B. This improved SNR is illustrated because the ratio of the power (or magnitude) of the signal of interest (SOI) (e.g., the magnitude peaks above the detection threshold in FIG. 7A) relative to the power of the noise (or unwanted signal) (e.g., peaks below the detection threshold in FIG. 7A) of the DCM system of FIG. 7A is greater than in the conventional system of FIG. 7B. For example, the ratio of the magnitude of peak 704 relative to the magnitude of peak 708 is approximately 1.7/1.0=1.7 whereas the ratio of the magnitude of peak 712 relative to the magnitude of peak 716 is approximately 3.5/3.2=1.09. Therefore, the output of the DCM system of FIG. 7A is less noisy than the output of the conventional system of FIG. 7B.

FIG. 8A illustrates a plot of magnitude in dB (shown along the y-axis) versus pulse width in microseconds (µS) (shown along the x-axis). The plot was generated using a one-delay system which applied a single DCM as described above with respect to, for example, FIGS. 2A-2B and Eqns. 4-8, in accordance with various embodiments. The solid line tracks the value of the magnitude outputs of the system.

FIG. 8B illustrates a plot of magnitude in dB (shown along the y-axis) versus pulse width in microseconds (µS) (shown along the x-axis). The plot was generated using a five-delay system which applied DCMs to the complex conjugates of five delayed signals as described above with respect to, for example, FIG. 5 and Eqns. 4-9, in accordance with various embodiments. The solid line tracks the value of the magnitude outputs of the system.

Comparing FIG. 8A to FIG. 8B illustrates that the SNR of the five-delay DCM system shown in FIG. 8B is advantageously improved over the SNR of the one-delay DCM system shown in FIG. 8A. This improved SNR is illustrated because the ratio of the power (or magnitude) of the signal of interest (SOI) (e.g., the magnitude peaks above 1 dB in FIG. 8B) relative to the power of the noise (or unwanted signal) (e.g., peaks below 1 dB in FIG. 8B) of the five-delay DCM system of FIG. 8B is greater than in the one-delay DCM system of FIG. 8A. For example, the ratio of the magnitude of peak 804 relative to the magnitude of peak 808 is approximately 1.7/1.0=1.7 whereas the ratio of the magnitude of peak 812 relative to the magnitude of peak 816 is approximately 1.6/0.8=2.0. Therefore, the output of the five-delay DCM system of FIG. 8B is less noisy than the output of the one-delay DCM system of FIG. 8A.

Various embodiments of the above-described systems and methods may be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A method for detecting and characterizing an input signal having an RF pulse train in background noise, comprising:
    receiving a signal having an in-phase (I) component and a quadrature-phase (Q) component;
    acquiring, at a first point in time, a first IQ sample of the signal;
    acquiring, at a second point in time, a second IQ sample of the signal;
    decorrelating a wideband noise background in the first IQ sample of the signal and the second IQ sample of the signal to reduce a noise floor, wherein the decorrelating comprises applying, using one or more processors, a delayed complex conjugate multiply (DCM) to the first IQ sample of the signal and the second IQ sample of the signal to produce a DCM product, the DCM product being random for background noise and substantially constant when a pulse is present, the product having an in-phase ($I_C$) component and a quadrature-phase ($Q_C$) component;
    determining, from the $I_C$ component of the DCM product and the $Q_C$ component of the DCM product, using the one or more processors, a signal magnitude and a signal frequency;
    generating, using the one or more processors, a sequence of $I_C$ components of the DCM product and a sequence of $Q_C$ components of the DCM product;
    smoothing, using the one or more processors, the sequence of $I_C$ components of the DCM product using one or more filters;
    smoothing, using the one or more processors, the sequence of $Q_C$ components of the DCM product using the one or more filters; and
    determining, from the smoothed $I_C$ component of the DCM product and the smoothed $Q_C$ component of the DCM product, using the one or more processors, a signal magnitude and a signal frequency.

2. The method of claim 1, wherein the DCM product is determined in accordance with $A\exp(j2\pi f^* T_s^* n)^* A\exp(-j2\pi f^* T_s^*(n-1))=A^2 \cos(j2\pi f^* T_s)+j^* A^2 \sin(j2\pi f^* T_s)$, wherein $A\exp(j2\pi f^* T_s^* n)$ is a complex number expression of the current IQ sample of the signal, $A\exp(-j2\pi f^* T_s^*(n-1))$ is a complex conjugate of a complex number expression of the previous IQ sample of the signal, $A^2 \cos(j2\pi f^* T_s)=I_C$, is the real component of the product of the current and previous samples, and $j^* A^2 \sin(j2\pi f^* T_s)=Q_C$, is the imaginary component of the product of the current and previous samples, A is the signal magnitude, f is the signal frequency, Ts is the sample time, n is the sample number (running variable), and j is the SQRT(-1).

3. The method of claim 2, wherein the signal magnitude is determined in accordance with $A^2=M=\sqrt{I^2+Q^2}$.

4. The method of claim 2, wherein the signal frequency is determined in accordance with $f=\Phi/2\pi T_S$, wherein phase difference $\Phi$ is expressed in radians and determined in accordance with $$\Phi = \tan^{-1}\left(\frac{Q_C}{I_C}\right)$$

and further wherein Ts is a the sample time.

5. The method of claim 1, wherein at least one of the one or more filters is a smoothing filter.

6. A non-transitory computer-readable medium having computer-executable instructions for performing a method comprising:
    receiving a signal having an RF pulse train in background noise, the signal having an in-phase (I) component and a quadrature-phase (Q) component;

acquiring, at a first point in time, a current IQ sample of the signal;

acquiring, at a second point in time, a previous IQ sample of the signal;

decorrelating a wideband noise background in the first IQ sample of the signal and the second IQ sample of the signal to reduce a noise floor, wherein the decorrelating comprises applying a delayed complex conjugate multiply (DCM) to the current IQ sample of the signal and the previous IQ sample of the signal to produce a DCM product having an in-phase $I_C$ component and a quadrature-phase $Q_C$ component;

determining, from the $I_C$ component of the DCM product and the $Q_C$ component of the DCM product, a signal magnitude and a signal frequency;

generating a sequence of $I_C$ components of the DCM product and a sequence of $Q_C$ components of the DCM product;

smoothing the sequence of $I_C$ components of the DCM product using one or more filters;

smoothing the sequence of $Q_C$ components of the DCM product using the one or more filters; and determining, from the smoothed $I_C$ component of the DCM product and the smoothed $Q_C$ component of the DCM product, using the one or more processors, a signal magnitude and a signal frequency.

7. A system for detecting and characterizing a signal having an RF pulse train in background noise, the system comprising:

one or more processors; and a memory, the memory including executable code representing instructions that when executed cause the system to:

receive a signal having an in-phase (I) component and a quadrature-phase (Q) component;

acquire, at a current point in time, a first IQ sample of the signal;

acquire, at a previous point in time, a second IQ sample of the signal;

decorrelate a wideband noise background in the first IQ sample of the signal and the second IQ sample of the signal to reduce a noise floor, wherein the decorrelating comprises applying, using the one or more processors, a delayed complex conjugate multiply (DCM) to the current IQ sample of the signal and a previous IQ sample of the signal to produce a DCM product having an in-phase $I_C$ component and a quadrature-phase $Q_C$ component;

determine, from the $I_C$ component of the DCM product and the $Q_C$ component of the DCM product, using the one or more processors, a signal magnitude and a signal frequency;

generate, using the one or more processors, a sequence of $I_C$ components of DCM product and a sequence of $Q_C$ components of the DCM product;

smooth, using the one or more processors, the sequence of $I_C$ components of DCM product using one or more filters;

smooth, using the one or more processors, the sequence of $Q_C$ components of DCM product using the one or more filters; and determine, from the smoothed $I_C$ component of the DCM product and the smoothed $Q_C$ component of the DCM product, using the one or more processors, a signal magnitude and a signal frequency.

* * * * *